May 26, 1964   R. S. FOOTE ETAL   3,134,957
METHOD OF AND APPARATUS FOR OBTAINING SEISMIC DATA
Filed Dec. 31, 1958   10 Sheets-Sheet 1

Fig.1

INVENTORS.
Robert S. Foote
George P. Sarrafian
BY

May 26, 1964  R. S. FOOTE ETAL  3,134,957
METHOD OF AND APPARATUS FOR OBTAINING SEISMIC DATA
Filed Dec. 31, 1958  10 Sheets-Sheet 3

Fig. 3

INVENTORS.
Robert S. Foote
George P. Sarrafian
BY

INVENTORS.
Robert S. Foote
George P. Sarrafian
BY

Fig. 7

INVENTORS.
Robert S. Foote
George P. Sarrafian

May 26, 1964  R. S. FOOTE ETAL  3,134,957

METHOD OF AND APPARATUS FOR OBTAINING SEISMIC DATA

Filed Dec. 31, 1958  10 Sheets-Sheet 8

INVENTORS.
Robert S. Foote
George P. Sarrafian
BY

United States Patent Office 3,134,957
Patented May 26, 1964

3,134,957
METHOD OF AND APPARATUS FOR OBTAINING SEISMIC DATA
Robert S. Foote, Richardson, and George P. Sarrafian, Dallas, Tex., assignors to Texas Instruments Incorporated, Dallas, Tex., a corporation of Delaware
Filed Dec. 31, 1958, Ser. No. 784,283
9 Claims. (Cl. 340—15.5)

The present invention relates to a method of and apparatus for acquiring data and particularly to the acquisition of seismic data. The apparatus of the subject invention constitutes the field equipment to be used in conjunction with a complete system for the digital analysis of seismic data entilted Seismic Exploration and disclosed in the co-pending application of Alexander R. Aitken, John A. F. Gerrard, Hal J. Jones and George P. Sarrafian, Serial No. 784,292, filed December 31, 1958, now Patent No. 3,075,607, dated January 29, 1963, which application is hereby incorporated by reference.

In seismic surveying it is common practice to generate seismic waves by the detonation of an explosive charge located either on or above the surface of the earth or in a hole drilled in the earth. On detonating the charge, shown at 131 in FIG. 1, the waves generated thereby travel in multiple paths including paths into the earth. The waves traveling into the earth are reflected back to the surface thereof from layers 132 and 133 which may be an interface between two different strats of earth, and are there detected by seismometers, or geophones, identified collectively as a seismometer spread 4. The seismometers convert the detected seismic waves into electrical signals which are then amplified and recorded. Each reflection adds sine waves to the normally horizontal graphical trace of the electrical output of the seismometer it is received by, and it is from the visual inspection of these sine wave traces that geologists are able to obtain the desired prospecting data. The recording may initially be on a visible type record or, as is a common practice at present, on a reproducible type record such as a magnetic medium. The reproducible type recording method has the advantage that the signal can be reproduced at will in order to permit signals to be analyzed and corrected, statically or dynamically, prior to being recorded on a visible type record.

A data analysis group of personnel is usually attached to each field exploration party. This group generally makes a preliminary analysis either in the field itself or near the exploration site of the record obtained. The analysis includes the removal of the effects of seismometer placement (move-out) on signal travel time, the interpretation of the record from the standpoint of identifying relevant seismic signals, and the determination of the depth and dip of lithologic interfaces beneath the experimental area by performing certain computations on the time of arrival of seismic signals at the detectors. The above procedure has, of course, been practiced for many years and the present invention proceeds from this well known art.

It is very desirable that a more complete analysis of the data be performed in a short period of time to direct the path of continuing the seismic exploration. This analysis can best be accomplished at a central data processing center. A major problem, and one which has not successfully been solved by the prior art, presents itself in providing satisfactory means for rapidly transferring the analog seismic data to a central processing center, analyzing the data and relaying the information derived from the analysis to the seismic crew in the field with directions as to how the seismic exploration may best continue.

The approach of transmitting the analog data directly to the central processing center is undesirable because of the losses encountered in the transmission of analog signals. Signal transmission of digital information, on the other hand, results in much lower information losses and has therefore been embodied in this invention.

However, in order to achieve the goal of rapidly transferring the seismic data to a central processing center, analyzing it and relaying it to the field crew in a very short period of time a special purpose digital computer which would perform the mathematical operations extremely rapidly had to be devised. Such a special purpose digital computer is the subject of a co-pending application of George T. Baker, Charles L. Kettler and George P. Sarrafian, Serial No. 784,358, entitled Computer, and filed on even data herewith, which application is hereby incorporated by reference and is now Patent No. 3,074,636, dated January 22, 1963.

In the practice of the present invention, the analog outputs of the individual seismometers are amplified concurrently and then multiplexed into a single analog output channel, which is applied to an analog-to-digital converter which codes the data in digtial form. The data is then recorded on a multi-track magnetic tape. Provision is also made for reversing the process, beginning with the digitized magnetic tape data and ending with multichannel analog signals which may then be recorded in standard analog form using a seismic camera. The purpose of this reversing process is to permit the field crew to monitor the seismic data immediately after a record has been made.

One important object of the present invention is to provide a method of recording seismic data with a greater dynamic range and in a form compatible with a digital computer.

Another purpose of the present invention is to provide a system for accepting multichannel input data, multiplexing it, digitizing the results and finally recording the digitized data on a magnetic medium.

The novel features which are believed to be characteristic of the invention, both as to its organization and method of operation, together with further objects and advantages thereof, will be apparent from the accompanying drawings, taken in conjunction with this specification.

It is to be expressly understood, however, that the drawings are for the purpose of illustration and description only and while showing the preferred embodiment are not intended as a definition of the limits of the invention.

FIG. 6 is a circuit diagram of the circuitry for taking the digitized information and presenting it to a recording media;

Figure 1:
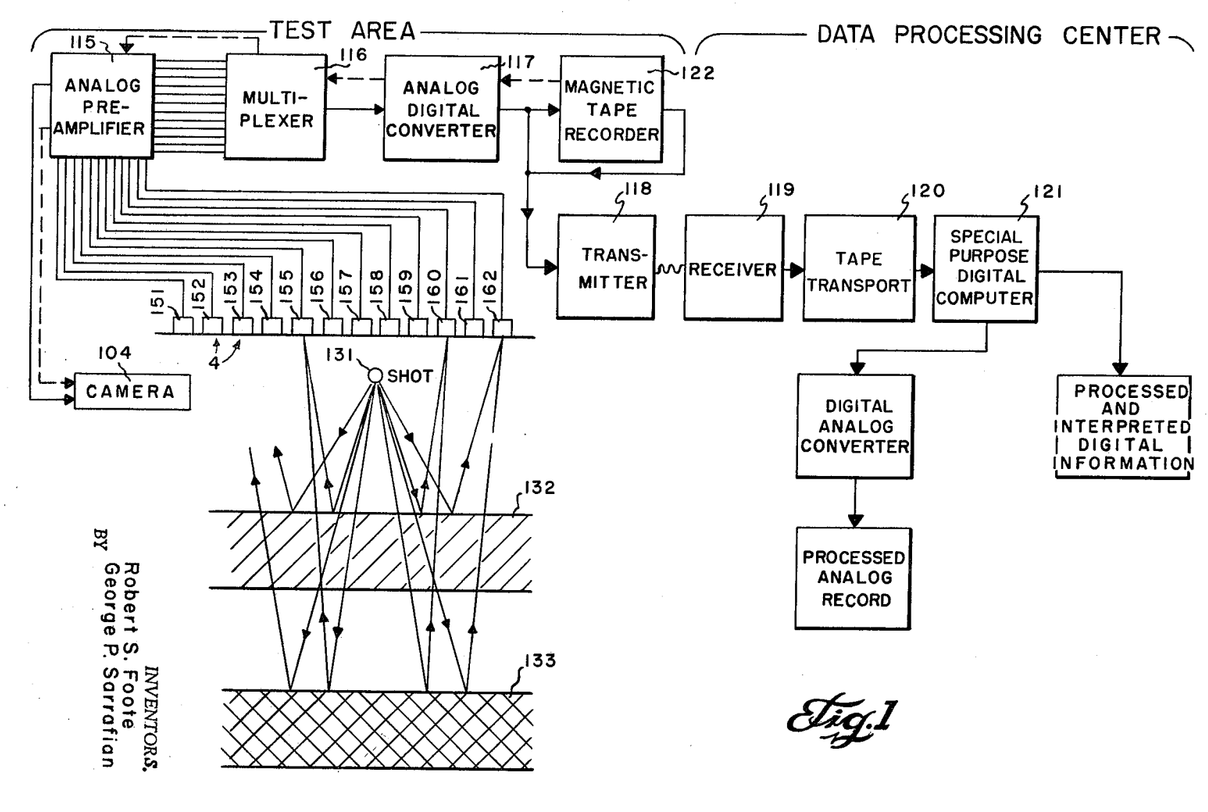
FIG. 1 is a block diagram of a complete system which embodies the present invention.
Figure 3:
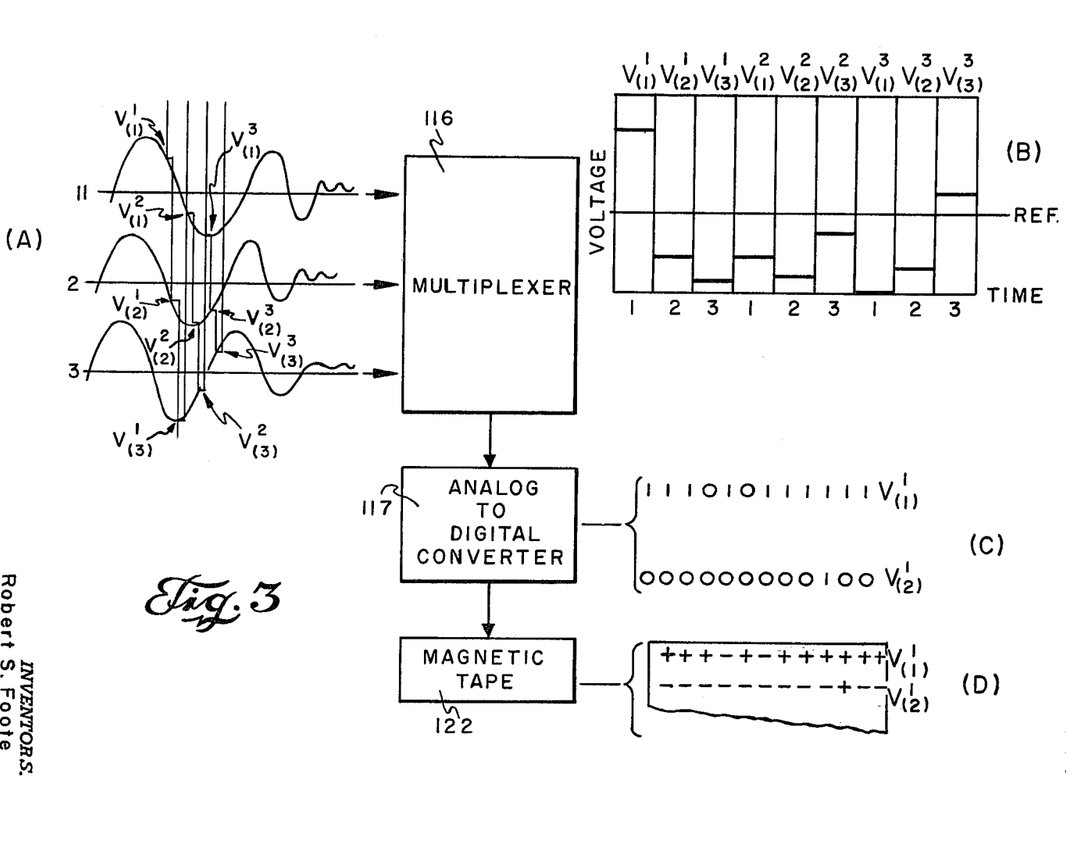
FIG. 3 represents a schematic drawing of the multiplexing operation.

Referring now to FIGS. 1 and 3, the general purpose and scope of this invention may be examined. This application is concerned with the acquisition of seismic data in its natural analog form and its conversion into digital data form. In digital form it may be examined and the intelligence therein quickly and accurately extracted by subsequent analysis in an apparatus corresponding to that shown in the mentioned copending applications. In practicing the present invention the electrical output of each of the twelve seismometers in the spread 4 is directed to an analog preamplifier indicated in box form in FIG. 1 by reference numeral 115. The electrical trace, or signal from each seismometer is fed individually into the amplifier 115 wherein it is identified as channels 1–12 and is therein amplified and sent individually in twelve corresponding channels to the unit identified in box form as multiplexer 116 wherein the twelve inputs are examined and selected in sequence and sent as indicated as a single channel output of analog data to the analog-to-digital converter 117. For simplicity in FIG. 3, only channels 1–3 are shown, and since each input channel is an electrical signal corresponding to a sine wave trace, these are shown graphically for illustrative purposes at (A). During "multiplexing," the amplitude of each curve 1, 2 and 3 is electrically examined in sequence at a plurality of very small time intervals as indicated by the horizontal sections of the ordinate lines as shown at (A) of FIG. 3. These curves, after being sampled in the multiplexer 116, may be represented by a voltage versus time presentation as shown at (B) of FIG. 3. This data may then be transferred to the analog-to-digital converter 117, wherein the digital results may be represented by a series of 12 digit binary numbers (known as 12-bit numbers) as shown at (C). Each positive voltage value $V^1_{(1)}$, $V^1_{(2)}$, etc. shown in graph (B) may be represented by a binary number (such as 111010111111) between the reference (or zero voltage value) binary number 100000000000 (or 011111111111) and the maximum binary number 111111111111 which corresponds to the maximum positive voltage value expected. Similarly, each negative voltage value shown at (B) may be represented by a erence number 100000000000 and the minimum binary number 000000000000. These values, if placed on a paper tape, would appear as shown at (C) and followed by a binary number which represents each successive voltage amplitude value ($V^1_{(1)}$, $V^1_{(2)}$, $V^1_{(3)}$, $V^2_{(1)}$, etc.) taken in each successive time interval.

The data thus obtained in the converter 117 is electrically suited to storage on a magnetic tape in unit 122 and this storage may be depicted as magnetized spots on a magnetic tape wherein the ZERO and ONE of the binary number are stored as negative and positive polarities of magnetization on the tape as shown schematically at (D) in FIG. 3. The plurality of binary numbers obtained in this method may be converted into radio signals and transmitted through transmitter 118 to a remote receiver 119 for analysis. As one manner in which this might be done, and this is given by way of example only, is in the use of radio telegraphy wherein the binary ONE is represented by a dot and the binary ZERO is represented by a dash. At the central data processing center, the data received by the receiver 119 is analyzed by a special purpose digital computer as fully described in the referenced copending application entitled "Computer." That portion of the method system shown in FIG. 1 which includes the analog preamplifier 115, the multiplexer 116, the analog-to-digital-to-analog converter 117, and tape recorder 122, is reversible, and the data received back at the amplifier 115 may be photographed by a seismic trace camera 104. This reversible process is indicated by the broken lines of FIG. 1, whereas the regular forward direction is shown by the solid circuit lines of FIG. 1.

Figure 2:
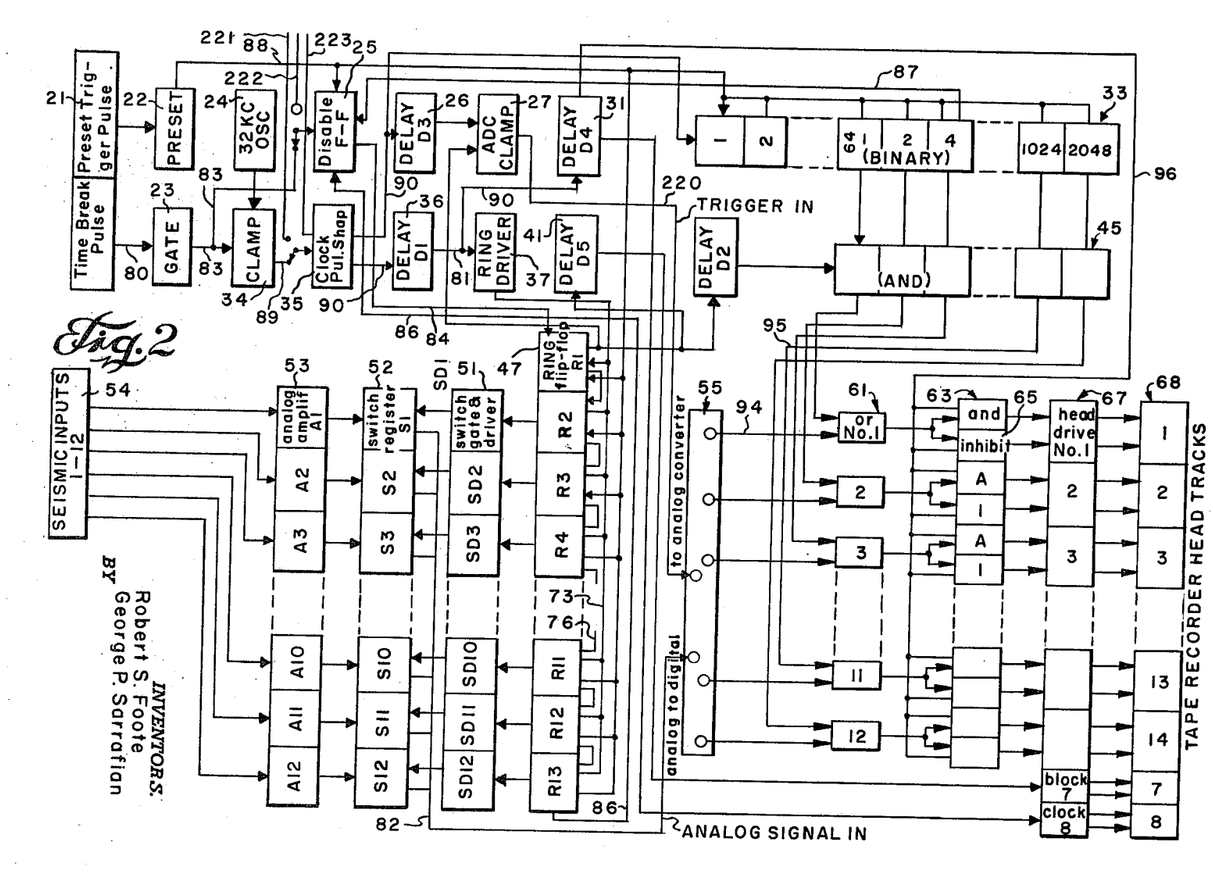
FIG. 2 is a block diagram disclosing a preferred form of the analog-to-digital-to-analog seismic system.

Referring now to FIG. 2, a preset trigger 21 supplies a positive pulse (a time increment prior to the detonation of the explosive charge 131) to a preset pulse generating circuit 22. The purpose of this preset pulse is to insure that a plurality of flip-flop circuits are in a predetermined state of conduction. Thus the preset pulse is directed via lead 88 from preset 22 to a disable flip-flop 25, a series of binary counting stages indicated generally at 33 and a ring counter 47. Each of the units in the ring counter designated by a block is a bistable flip-flop and are identified individually as R-1, R-2, etc. A master timer or clock for the entire system is provided by a 32 kc. crystal oscillator 24. When power is applied to the circuit, the clock 24 begins to operate at a frequency of 32 kilocycles. This crystal-controlled clock 24 will operate independently of all other equipment until the circuit power is turned off. Gate 23 is activated through lead 80 by the electric impulse that sets off the explosive charge, said gate consisting of a one-shot multivibrator. Upon receipt of a signal, said gate is opened for 5.5 seconds. This time interval is sufficient for the energy from the explosive charge to penetrate into the ground to all depths of interest, 132, 133, etc. and to return to the individual seismometers 151–162. Output of gate 23 is supplied to a clamp 34 and to disable flip-flop 25 through lead 83. The clamp 34 serves to reduce the amplitude of the 32 kc. oscillator output by a factor greater than 50 without destroying the 32 kc. oscillation. When the gate signal is received from gate 23, the clamp 34 is released to allow the sinusoidal clock signal to reach a clock pulse shaper 35 via lead 89 where the main control pulse chain is formed. The clock pulse shaper 35 is a monostable flip-flop which triggers on the positive portion of the 32 kc. sine wave. This clock pulse feeds all controls through its output leads 90, including the binary counter 33 composed of 18 stages and time delay multivibrators D1, D3 and D4, indicated by blocks 36, 26 and 31, respectively. These time delay multivibrators, in turn, control the timing for parallel transfer of data onto a magnetic tape.

Figure 4:
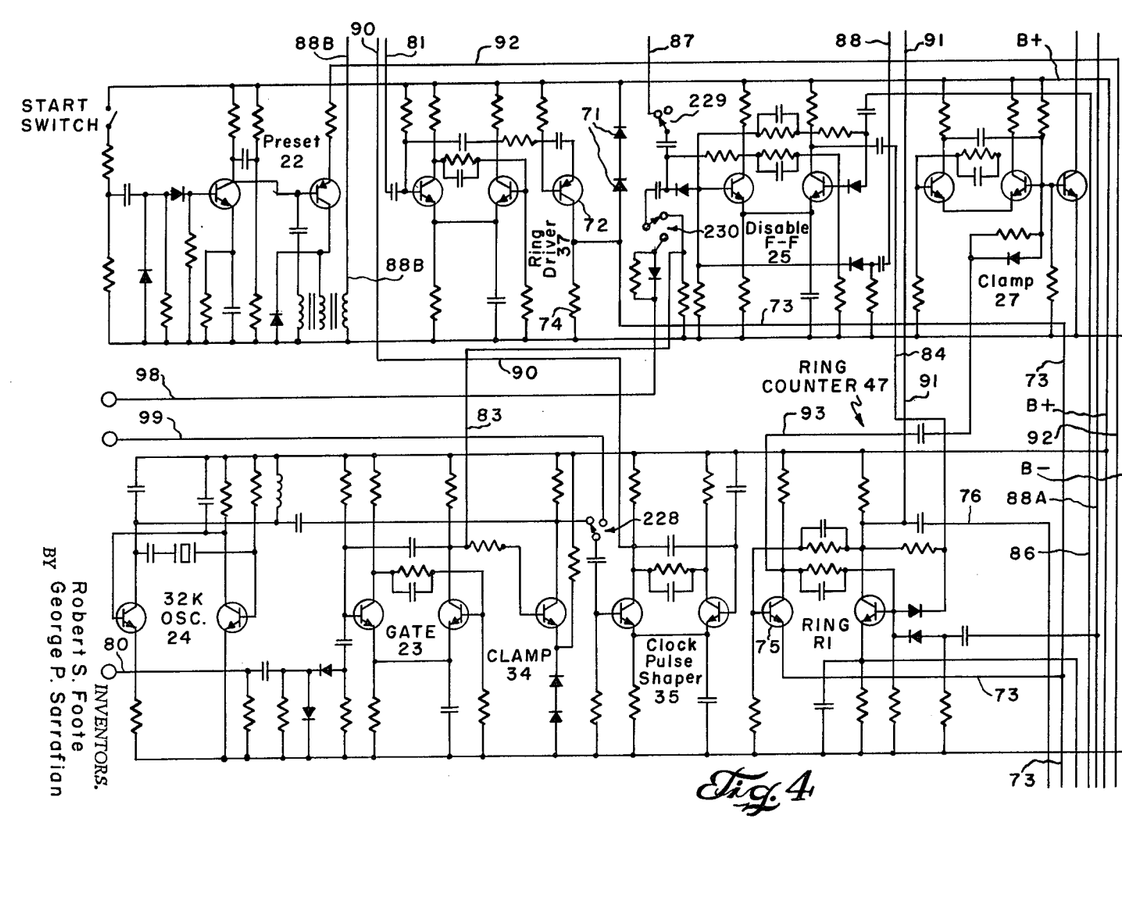
FIG. 4 is a circuit diagram of one control circuitry.

One output from delay D1, indicated by block 36, is through lead 81 to a ring driver 37. This ring driver as indicated in FIG. 4 consists of a PNP transistor amplifier operating with a collector voltage held constantly at 4.9 volts by the use of a pair of Zener diodes 71. This collector 72 of the ring driver 37 is also in common via lead 73 with all of the emitters on one side of a ring counter 47. This emitter connection is the off side of the ring when the ring is not cycling. On top of the 4.9 volt D.C. level for the collector of ring driver 37, an 8 volt pulse is created which is sufficient to operate the ring. The output of the ring driver 37 is taken ahead of the collector resistor 74 and is applied to the emitter 75 of each of the ring flip-flops R1–R13 through lead 73. A disable flip-flop 25, through its output lead 84, controls the operation of the ring counter 47. Initially the disable flip-flop 25 is set so that a negative pulse through lead 83 initiated from the gate 23 sets the disable flip-flop 25 to the opposite mode. This shifting to the opposite mode sends a negative pulse via lead 84 to ring flip-flop R1, thereby activating the ring counter 47. Ring counter cycle operation is accomplished by the positive emitter pulse through lead 73 turning off any stage in the ring counter 47 that may be in the "on" mode. Thus, it may be seen that the disable flip-flop 25 initially turns ring flip-flop R1 in the ring counter 47 "on." The pulse from the ring driver 37 which originates with the 32 kc. oscillator 24 will turn ring R1 "off," which automatically sends a pulse through lead 76 to ring flip-flop R2 to turn it to the "on" position. This is a stable condition for ring R2 until the next pulse from the 32 kc. oscillator 24 comes along by way of clamp 34, clock pulse shaper 35, delay D1 (36), ring driver 37, and then to turn ring flip-flop R2 off, which, in turn, will turn "on" ring flip-flop R3. It can be seen that in this manner the pulse is stepped along the ring counter from the first stable state to the second stable state in each of the bistable flip-flops R1–R13 of the ring counter 47. And this condition continues until the last ring flip-flop R13 is encountered. At this time the output from the ring driver 37 will turn the first half of the last bistable flip-flop R13 "off," but this last flip-flop has no additional flip-flop to accept its negative pulse. Therefore, this output negative pulse from the last flip-flop R13 is sent back to preset the disable flip-flop 25 through lead 86. The distable flip-flop 25 is shifted again to the opposite mode at every clock binary count of 64 pulses through lead 87, which causes a recycling of the ring. The process continues as long as the gate 23 and clamp 34 allow the clock pulse shaper 35 to deliver pulses.

Delay D1 indicated at 36 creates a pulse delay of approximately 12 microseconds. This delay is required to allow the distable flip-flop 25 to activate the ring counter 47 prior to the appearance of the ring drive pulse from the ring driver 37 which drives the ring at the clock frequency of 32 kc.

Figure 5:
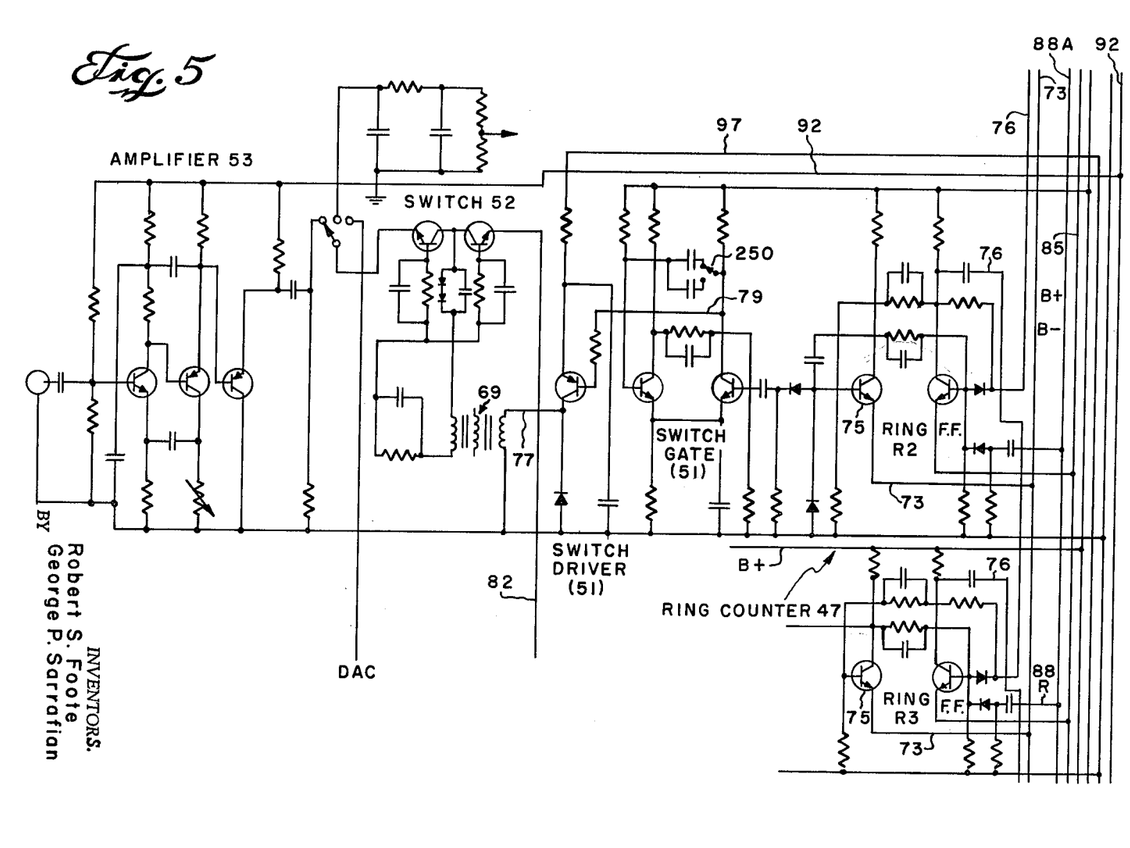
FIG. 5 is a circuit diagram of the analog switching and amplifying circuitry and the ring flip-flops.

A typical set of ring flip-flops R2 and R3 are shown in detail in FIGURE 5. These flip-flops are initially preset to the mode in which ring drive pulses via lead 73 from the ring driver 37 will not shift the state. The negative pulse from the output (lead 84) of the disable flip-flop 25 shifts the mode of ring flip-flop R1 only, leaving the remaining flip-flops unchanged. The following ring drive pulse reverts the ring flip-flop R1 back to its original condition and the negative pulse created by ring flip-flop R1 itself, in shifting back to its original mode, is fed via lead 76 to activate ring flip-flop R2, and the output of R2 via its lead 76 activates R3, etc. As described previously, it is in this manner that the pulse travels throughout the ring counter 47 until the last flip-flop R13 is triggered through its output lead 86, which is used to disable the disable flip-flop 25.

It is the object of the circuit shown in block diagram form in FIG. 2 to accept seismic analog inputs at input block 54, to digitize these analog inputs sequentially to read the digital output in parallel form, and to apply this digital output to a tape recorder head 68. It is also desirable to record on the tape recorder 122 a reference time for the digitized output. For this latter purpose, the binary counter 33 and binary AND gates 45 are utilized in conjunction with the same circuitry which is used to apply the digital information to the tape recording head 68. The manner in which this overall purpose is achieved may probably best be explained with respect to a single channel input. Therefore, this discussion will consider ring flip-flop R2 of the ring counter 47 which corresponds to unit SD1 of switch gate and driver 51 and to switch S1 of switch register 52, and analog amplifier A1 and the first channel input. The seismic inputs appear continuously at each of the channels in the seismic input block 54 and each of these inputs is continuously being amplified in the bank of amplifiers 53 in a manner well known in the art. However, they are being sampled at the rate of once every 2 milliseconds at the switch register 52, elements of which are turned "on" in sequence by the switch gate and driver bank 51 which has its individual circuits turned on sequentially by the ring counter 47. The circuit of the switch gate in the switch gate bank 51 is shown in a separate figure (FIG. 5) to be a monostable flip-flop whose switch time is accurately positioned to set the length of time that the analog input signal is allowed to pass through the switch 52 and lead 82 to the input of the ADC 55. Each of the switch drivers receivers an output (lead 79) from the switch gate and which, through lead 77 and by means of a pulse transformer 69, drives the switch transistors from cutoff to saturation in .15 microsecond for the period of time as provided by the switch gate 51.

As each analog signal is read from the individual seismic input channels in sequence to the analog-to-digital converter 55, a trigger input is also supplied to the analog-to-digital converter 55 from the ADC clamp 27. The clamp 27 receives opening signal from ring flip-flop R1 allowing delay D3 pulses to pass through the clamp to the ADC trigger input.

Figures 2A, 11, 12:
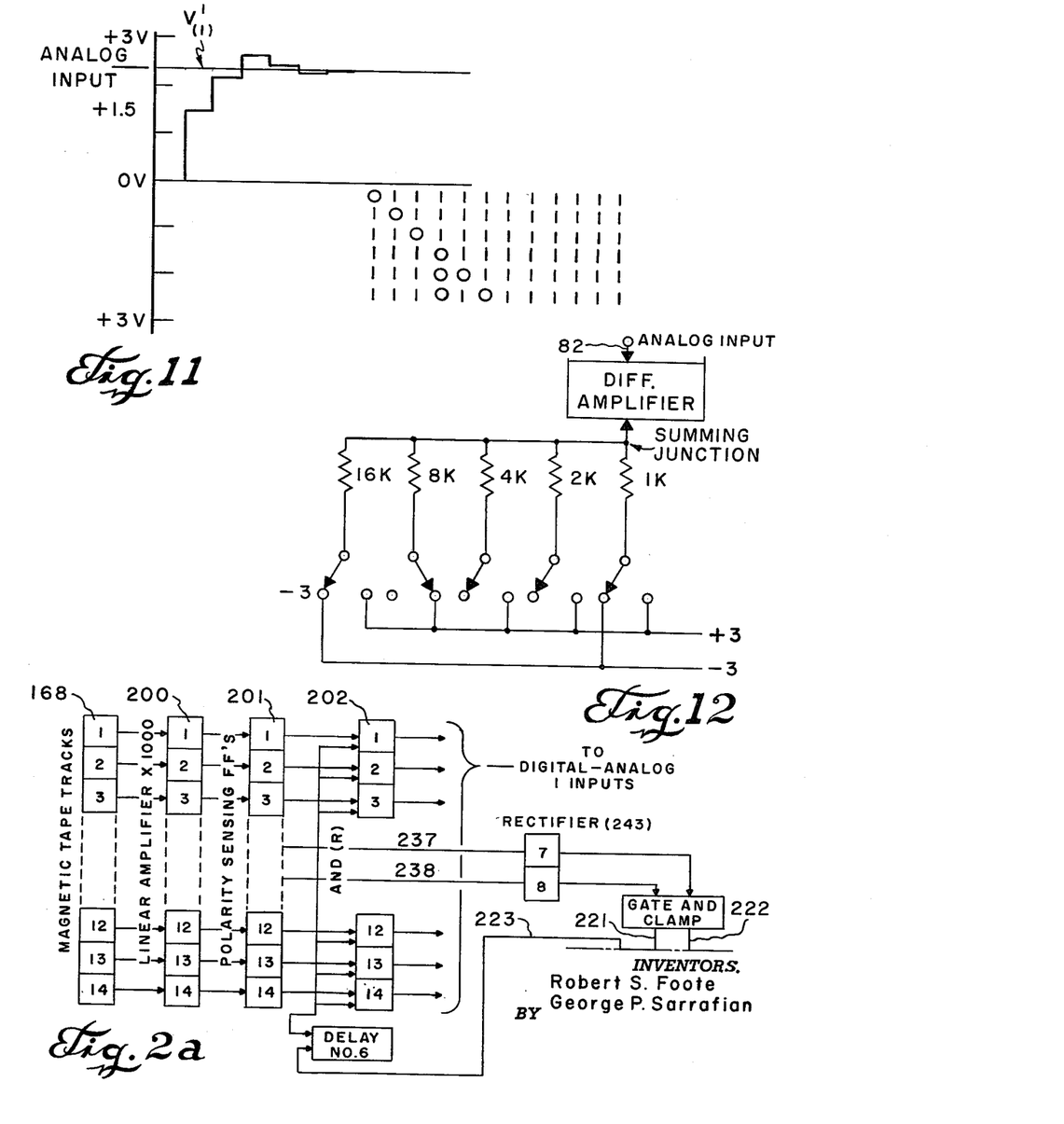
FIG. 2a is the readout section of the system of FIG. 2.
FIG. 11 is a graphical view of the binary analysis of a single analog value.
FIG. 12 is a circuit and schematic representation of the network used to obtain the result of FIG. 11.

The operation of the analog-to-digital-to-analog (ADC) converter 55 may be examined (relative to its analog-to-digital conversion) as follows. Initially, the analog signal is fed into the analog-to-digital converter 55 in successive order from the switch register 52. Also, a trigger is fed into the analog-to-digital converter from the clamp 27. This output from clamp 27 initiates the operation of the ADC 55. The flip-flop register of the converter itself (not shown) is set to a midrange value. Digitally, this corresponds to 011111111111 (or 100000000000 as previously used in an earlier analysis). Upon the application of the digitization command pulse, a representation of the number in the flip-flop register (converted to analog form) is compared with the analog amplifier output. This comparison is made as depicted in FIG. 11 by a differential amplifier and comparator circuit, whose purpose is to determine which of the two signals is the greater. If the analog input is greater, the first digit is changed from a zero to a one, and the second digit is automatically changed from a one to a zero. In the voltage analysis that takes place in the comparator circuit, the voltage value is changed in steps in the flip-flop register from its starting value 0V to one half of the remaining difference to the reference voltage value (+3 volts in this case) so that by repeatedly splitting the difference a value will be reached to coincide with the analog input. Conversely, if the analog input is less than the number in the flip-flop register, the first digit remains a zero and the second digit is changed from a one to a zero. In FIG. 11 it will be seen that the voltage value in the flip-flop register is changed in the first step from one-half to one-fourth of the total number (+3 v. to —3 v.) that can be represented in the flip-flop register. In order to get an analog value from the digital register, constant current sources are provided at the output of each of the flip-flops, currents from which are fed through a group of summing resistors (FIG. 12) so weighted as to be proportional to the values of the bits in the binary number. When the proper number and value of the summing resistors have been added to the circuit to balance the analog input, the position of the flip-flops, one or zero state (which control the switches shown in FIG. 12) which switched the summing resistor associated with each flip-flop (not shown) to either the +3 or —3 volts, gives the digital representation of the analog number. This process is repeated in exactly the same manner during the next control cycle pulse. This series of control pulses is numerically equal to the number of comparisons that are made which is equal to the number of digits in the flip-flop register. A timing pulse is taken from the timing programmer in the ADC 55 which allows the ADC gates to sample voltage levels in the ADC flip-flop register and read out pulses in parallel for those FF's where a one might exist.

The approximation or comparison will continue to the end so that the maximum error possible will involve only the least significant bit. There is an end pulse or stop pulse which causes the gates to be opened and permits the digitized signal to be read out in parallel.

Figure 9:
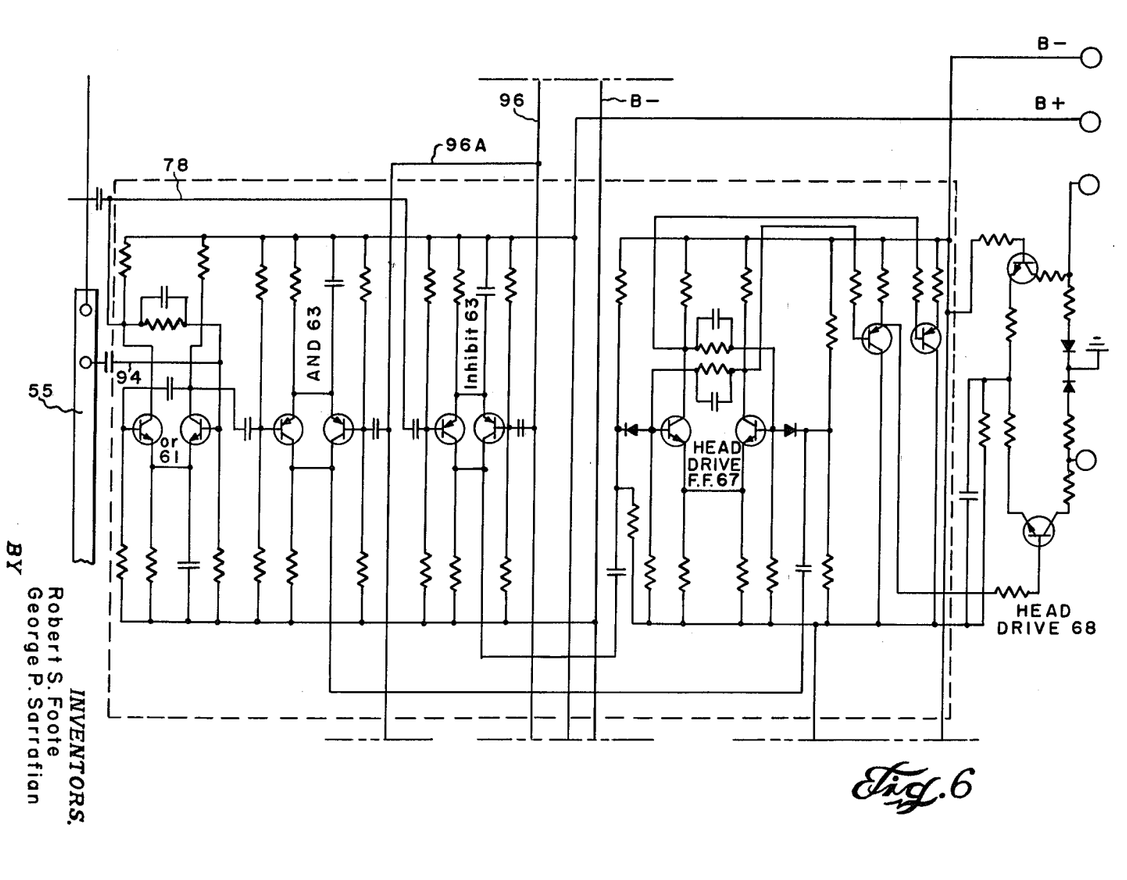
FIG. 9 is a diagrammatic view of one section of the recording tape which receives the digitized information at one stage in the system of this invention.

The digital output from the analog-to-digital converter is fed through a bank of OR gates 61 and then to a bank of AND circuits 63 and INHIBIT circuits 65. An output from either the AND circuit 63 or the INHIBIT circuit 65 is fed to the head drive circuit 67 and then to the taper recorder head 68. This same current path through the OR circuit 61, either the AND circuit 63 or INHIBIT circuit 65, and head drive circuits 67 to tape recorder circuit 68 is used by the output of the binary AND circuit 45. The purpose of the output from the binary AND circuit 45 is to record on the magnetic tape an indication of the time (or time interval, as shown in the first channel of FIG. 9). This record of the time may then be used for identification purposes. In order to have no outputs from the binary AND for time for the first word recorded we must preset all binary FF's to the "1" mode. The first clock pulse will then shift all binary FF's to the zero mode so that D2, which samples 27 microseconds later will see a "zero" in the register instead of a "one."

The head drive flip-flops 67 determine the state of magnetization in the magnetic tape as controlled by the head drive circuits. The head drive flip-flops accept output pulses from the AND circuits 63 and INHIBIT circuits 65 in a manner that the AND output pulses cause the direction of magnetization in the tape to be opposite the the magnetization caused by the INHIBIT output pulses. Each head drive flip-flop is followed by an emitter follower to provide the required drive impedance to operate the head drive transistors. Head drive flip-flop #7 shown on the block diagram in FIG. 2 shifts its state once for each 64 clock pulses (2000 microseconds). Head drive flip-flop #7 receives a negative trigger pulse from delay D5 shown at 41. Delay D5, in turn, receives its pulse from ring R1. A 27 microsecond delay is provided by delay D5 so that head drive track 7 (block track) records simultaneously with all other tracks on the magnetic tape, which causes a current change to tape head every data block. Head drive flip-flop #8 shifts its state every clock pulse as controlled by the negative output pulses from delay D4 which is shown at 31. Delay D4 causes the clock pulses to be delayed 29 microseconds so that the head drive flip-flop #8 will be synchronized with the proper digitized seismic input data.

The head drive circuits 67 associated with each of the 14 tracks control the current necessary to drive the magnetic tape to saturation.

A magnetic tape readout circuit has been developed which recreates the digital waveforms used to magnetize the magnetic tape, and samples these waveforms to determine if, at a given time, the digital bits are ONE'S or ZERO'S. These decisions are sent to a digital-to-analog converter in which switch gates are set so that the analog equivalent of the binary number is developed for short periods of time. By inverse multiplexing and filtering of the digital-to-analog data, conversion to multichannel analog data and simultaneous recording of multichannel data can be achieved.

The readout system is intended to recover in analog form the binary digital data recorded on magnetic tape. The system amplifies the voltage pulses generated from the magnetization changes appearing on the tape, created by the tape in motion with respect to the pick up heads. These amplified signals are sent to sensing circuits in which decisions are made as to whether the playback signals are positive or negative with respect to a zero average. Thus, waveforms identical to the current driving waveform that magnetize the tape are developed. An AND circuit then samples these waveforms that represent ONE's and ZERO's of a binary number to ascertain whether a set pulse should be sent to a digital-to-analog converter for the development of 10 microsecond output storage pulses. The multiplexing system used for the original analog-to-digital conversion of multichannel data provides proper voltage associated with each channel at the correct time. If this voltage is transmitted through the multiplexed switches to charge a storage capacitor in such a manner that the switch, for a particular channel, closes from 1 to 2 microseconds after the digital-to- analog conversion has been performed, and opens before the digital-to-analog conversion per channel has ceased, then each time the switch closes it will set the capacitor in steps to a new value. Then, by filtering with an appropriate filter, a smooth representation of the analog voltage identical to that which was originally digitized can be produced.

The circuitary shown in FIG. 2 of this application is integrated with the magnetic tape readout circuitry (FIG. 2a). To accomplish this, switching must be made in various parts of the system to allow the timing information from the magnetic tape to control all operations and provide an analog presentation by camera 104 of the digitized tape data as indicated by the broken lines of FIG. 1.

In FIG. 4, switch 228 must be switched from the internal 32 kc. clock to accept pulses developed by the readout of the clock track (D—A lead 99). It is desirable to have each block pulse control the operation of the disable flip-flop 25, which controls the operation of the multiplexer, rather than depending upon the binary count down control. By depending on the binary count down control, malfunction could result if a tape playback clock pulse were missed. Therefore, switch 229 prevents binary 33 from controlling the disable flip-flop. Instead, switch 230 allows the block track to operate the disable flip-flop and to control the multiplexing operation. Delay multivibrator D3 must be removed from the circuit since te main preset pulse which clears the digital-to-analog converter must commence at time zero for each data block pulse. Similar switches are provided (not shown) to remove delay multivibrator D3 and control the digital-to-analog trigger pulse at the time of the clock pulse.

At time zero for each recorded word, the readout polarity sensing circuit has indicated on its flip-flop type output whether ONE or ZERO should exist in the binary number. Delay multivibrator D6 supplies the trigger to an AND circuit which samples the D.C. level of the sensing flip-flop and determines whether a set pulse should be sent to the digital-to-analog converter. At the same time, the developed clock pulse triggers delay multivibrator D1 with its 12 microsecond delay. At the end of this delay, the appropriate ring flip-flop in the ring counter 47 changes the output storage capacitor to the proper voltage, as set by the digital-to-analog converter. Prior to the closing of this switch, the digital-to-analog converter must have presented the analog representation of this binary number. This digital-to-analog converted voltage exists until the next clock pulse, which causes a new trigger pulse to reset the digital-to-analog converter. Prior to this time, the switch transferring the digital-to-analog voltage to the storage capacitors must be open. Therefore, the time of the monostable multivibrator switch gate 52 in each seismic channel must be changed from its original 26 microseconds to less than 18 microseconds. This time is set at 10 microseconds, and switches 250 are added to accomplish this switching.

The function of the transistorized readout circuit may be seen by reference to FIGS. 2, 2a, 7 and 12. The magnetic tape has fourteen recorder heads 168, each requiring an amplifier 200 with a gain of about 1000 on playback. The amplifier output is transformer coupled to a polarity sensing flip-flop 201 by means of an emitter follower 251. The polarity sensing flip-flop 201 is driven by means of a high inductance center tapped transformer that provides a half power point bandwidth from 10 cycles to 100 kc. The transformer is coupled to the flip-flop with silicon diodes while the flip-flop uses germanium transistors. Operation is possible since the forward voltage drop across a silicon junction is about .4 volt greater than that for germanium. The normal cross-over capacitors are removed when both bases are controlled in order to speed rise and fall times.

Figure 7:
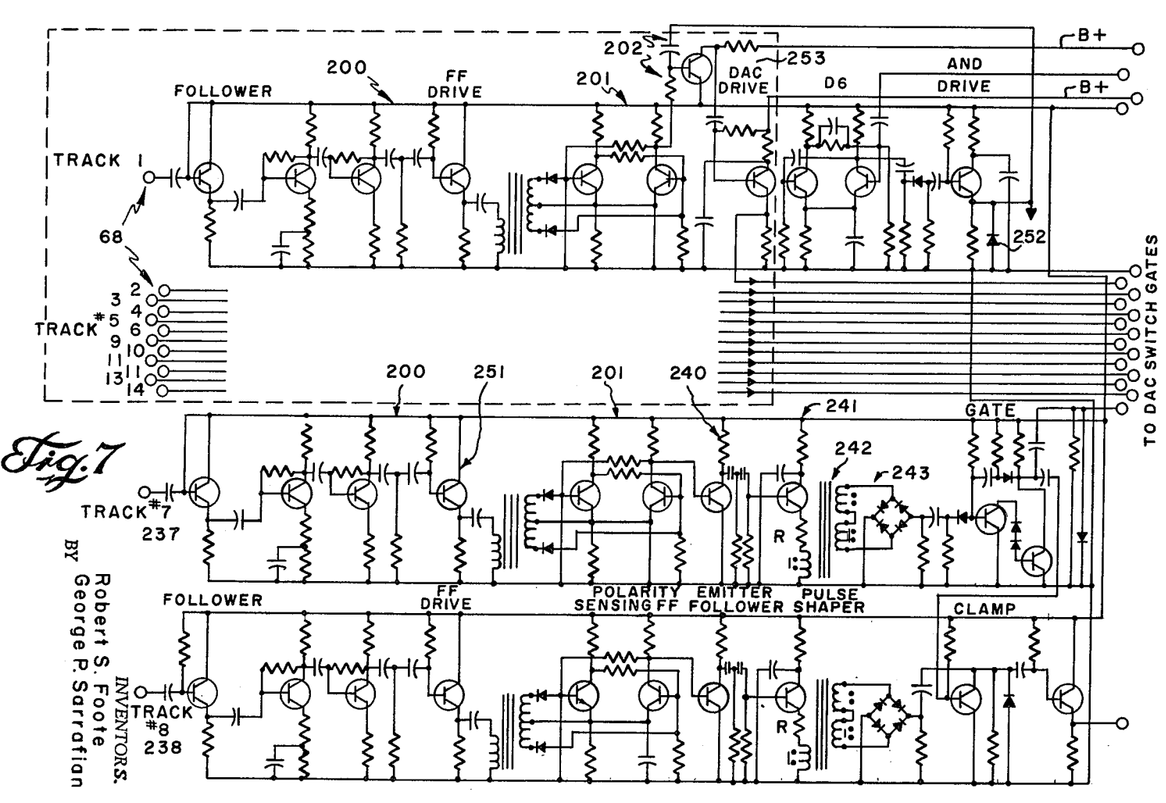
FIG. 7 is the detail circuitry for the playback of digitized magnetic recording and reconverting it to analog form.
Figure 8:
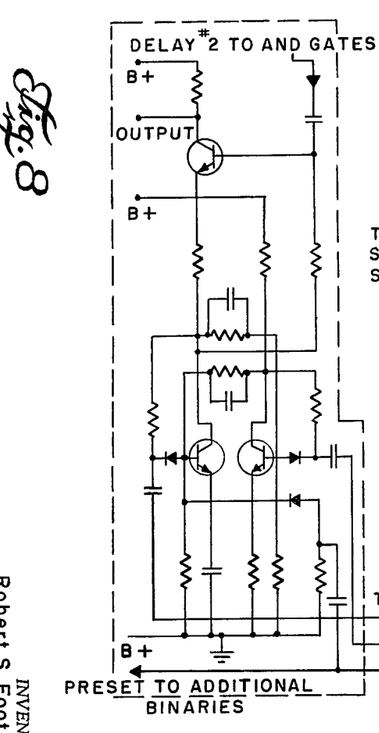
FIG. 8 is a detail circuit diagram of a single flip-flop circuitry employed in the binary counting chain.

The output of the polarity sensing flip-flops 201 is sent to a series of AND circuits 202. The AND circuit samples the D.C. level of one side of the polarity sensing flip-flop 201. These levels exist either at +4 volts or +12 volts. The AND sampling pulse is +8 volts, as limited by a Zener diode 252. When the D.C. level is +4 volts, a +8 volt pulse is not sufficient to cause an output pulse to be created by the AND circuit. However, if 12 volts exist, a +8 volt pulse causes a pulse to be driven into the base of the output amplifier.

Delay multivibrator D6 is a monostable multivibrator with a delay time set at 11 microseconds. The delay pulse is amplified to +8 volts, as set by the Zener diode 252, and supplies the +8 volt pulse to the AND circuit.

The digital-to-analog converter 55, which is integrally constructed with the analog-to-digital converter 55, is used when it is desired to reverse the system just described and obtain data in analog form from the tape recorder tracks 68. The digital-to-analog converter drive amplifier 253 accepts the output from the readout AND circuit pulses and provides 8 volt pulses with rise times less than 1 microsecond which are sent to the digital-to-analog converter to set the appropriate digital-to-analog circuitry. These outputs exist for 12 of the 14 magnetic tape playbacks. For block track No. 7 referenced at 237 and clock track No. 8 referenced at 238, the polarity sensing flip-flops are followed by different circuitry. Tracks Nos. 7 and 8 use an emitter follower 240 after the polarity sensing flip-flops 201. The emitter followers prevent the loading caused by the differentiating and pulse shaping circuitry from affecting the rise and fall times of the polarity sensing flip-flop 201. After the emitter follower in channels 7 and 8, the pulse shaper 241 drives a pulse transformer 242 in which equal amplitude positive and negative output pulses can be formed by adjusting the resistance R. The pulse shaper 241 is followed by a full wave bridge 243 which converts the positive and negative pulses to all negative pulses for track No. 7 and all positive pulses for track No. 8. Basically, a negative pulse of the readout circuit, if present, causes +3 or −3 volts to be switched to a precision resistor network (FIG. 11) causing a given voltage to be created at the summing junction. This creates, for a short time, the analog equivalent of the binary number presented.

The output of the digital-to-analog converter is fed into the multiplexer 116 in an inverse manner (to its normal output). This multiplexer assigns the proper digital-to-analog output pulse to its storage capacitor. Here the charge is held as a step function, and is modified discretely one time per data block. A 120 ohm resistor must be added in series with the digital-to-analog output of the multiplexers to critically damp the resonant circuit formed by the storage capacitor and the inductance of the wiring in the associated circuitry.

The readout system described will give an accurate reconstruction of digitized seismic data for frequencies of less than 250 cycles per second with 2000 microsecond sampling rates and a frequency of less than 500 cycles per second for 1000 microsecond sampling rates. This accuracy, with a sample-and-hold circuit used in the digitizing process to hold the input analog voltage constant during a digitizing cycle should be greater than one part in 2000 for a 12-bit binary number. The analog records produced by this system are of comparable quality to those produced directly from the playback of magnetically stored analog records.

A complete analog-to-digital-to-analog converter operation not included in this specification is disclosed in EPSCO, Inc. (588 Commonwealth Avenue, Boston, Massachusetts) instruction manual for model B-611 converter, and this manual is incorporated in this specification by reference.

Due to the necessity of locating the various components and subassemblies of the complete circuitry of the system shown in FIGS. 2 and 2a, it will be desirable to tabulate the interconnecting leads between the functioning circuits to follow the operation and to facilitate reference from one patent sheet to the next:

| Reference Numeral | Lead Nomenclature |
|---|---|
| 73 | Ring Driver output to all Rings. |
| 76 | Ring R1 to Ring R2; R2 to R3; etc. |
| 77 | Switch to Switch Gate. |
| 78 | Binary AND to OR Circuit. |
| 79 | Switch Gate to Switch Driver. |
| 80 | Preset timebreak to Gate. |
| 81 | Delay D1 to Ring Driver. |
| 82 | Switch to Analog Input of ADC. |
| 83 | Gate to Clamp 34. |
| 83a | Gate to Disable FF. |
| 84 | Disable FF to Ring R1. |
| 85 | Ring R1 to All Rings. |
| 86 | Ring R13 to Disable FF. |
| 87 | Binary to Disable FF. |
| 88 | Preset to Disable FF. |
| 88a | Preset to Ring Counter. |
| 88b | Preset to Binary. |
| 89 | Clamp to Clock Pulse Shaper. |
| 90 | Clock Pulse Shaper to Binary. |
| 90a | Clock Pulse Shaper to Delays D1, D3, D4. |
| 91 | Ring R1 to Delay D5. |
| 92 | Power Supply (Preset). |
| 93 | Ring R1 to ADC Clamp. |
| 94 | ADC to OR. |
| 95 | Binary AND to OR. |
| 96 | Delay D4 to AND. |
| 96a | Delay D4 to INHIBIT. |
| 97 | Power Supply. |
| 98 | DAC Block Pulses to Disable FF. |
| 99 | DAC Clock Pulses to Pulse Shaper. |
| 220 | ADC Clamp to ADC. |
| 221 | Readout to Gate. |
| 222 | Readout to Clamp. |
| 223 | Readout D6 to Clock Pulse Shaper. |

Figure 10:
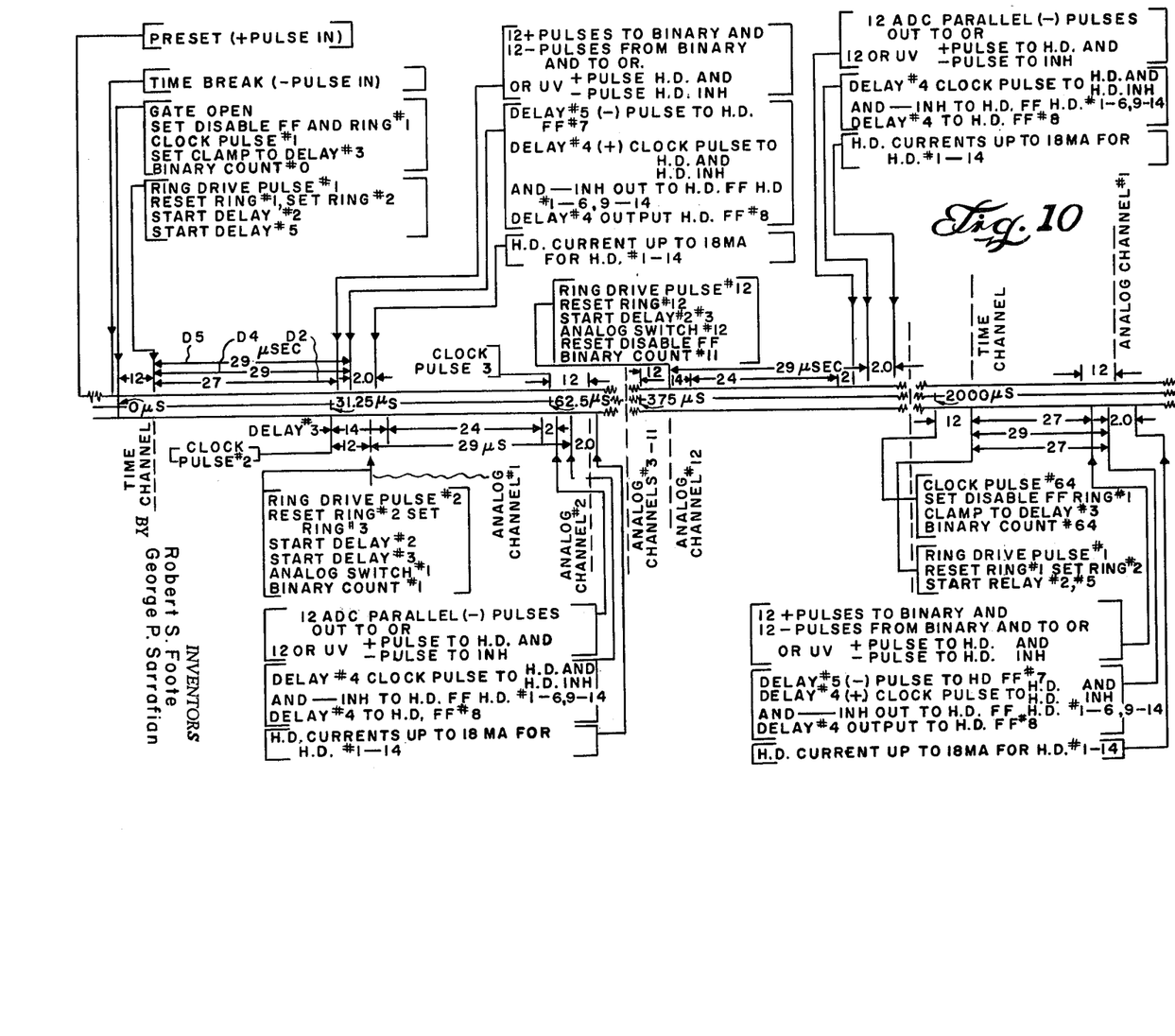
FIG. 10 is a graphical presentation of the digital seismic system time schematic.

In FIG. 10 a summary of the method of operation of the system shown in FIG. 2 may be observed. The center line of this graphical presentation is the elapsed time axis. Starting from the left, the first vertical line crossing the time axis is the zero time or the starting time for a complete operation. The blocks shown above the line at the upper left include the steps in sequence required to start the time circuit in operation (12 microseconds after the zero time) and subsequently (through the steps shown at the upper center of FIG. 10) print a binary number representing the initial time channel as well as the data block and clock information on the magnetic tape after the lapse of an extremely minute operating time (approximately 31 microseconds). Just prior to the printing of the initial time channel, the operation shown below the line and at the left in FIG. 10 are begun to obtain a binary number corresponding to analog channel No. 1, and this results in the magnetic printing of this channel on the tape after another 31 microsecond lapse of operating time. Analog channels Nos. 3–11 are similarly converted to digital numbers and placed on the tape in sequential and parallel order, but because of similarity of operation are not individually called out on the drawing. At about the time analog channel No. 11 is printed on the tape (or drum), the operations to obtain and print a binary number corresponding to analog channel No. 12 are commenced by the steps shown just above the line at the center of FIG. 10 and at the upper right of the drawing. A period of dead time follows the printing of channel No. 12 to permit subsequent insertion of information of the tape, and after the expiration of 2000 microseconds of elapsed time, the operations shown below the line at the right side are commenced which will then repeat the steps of obtaining and printing of binary numbers to correspond to the time and to each of the twelve analog channels.

The above description comprises a preferred embodiment of the present invention and numerous modifications could be made thereto without departing from the spirit and scope of the invention which is limited only as defined in the appended claims.

What is claimed is:

1. A method of reversibly obtaining a digital seismic signal comprising the steps of: producing a seismic disturbance, receiving at spaced points in the vicinity of said seismic disturbance a series of seismic signals generated by said seismic disturbance, sequentially sampling the amplitudes of said seismic signals, converting the sequentially sampled amplitudes into digital data, applying said data to a recording medium, reconverting said recorded data into analog seismic signals, visibly displaying said analog seismic signals, and retaining during said applying operaton a continuous digital elapsed time index referenced to the occurrence time of said seismic disturbance.

2. A method of obtaining a digital seismic signal comprising the steps of: producing a seismic disturbance, receiving at spaced points in the vicinity of said seismic disturbance a series of electrical waveform signals generated by said seismic disturbance, sequentially sampling the amplitudes of said signals, converting the sampled electrical amplitudes into a plurality of binary coded digital data, magnetically recording said digital data in parallel form, and recording a continuous digital elapsed time index referenced to the occurrence time of said seismic disturbance.

3. A method of obtaining a digital seismic signal comprising the steps of: producing a seismic disturbance, receiving at spaced points in the vicinity of said seismic disturbance a series of electrical signals generated by said seismic disturbance, sequentially sampling the amplitudes of said signals, converting the sampled electrical amplitudes into a plurality of binary coded digital data words, generating a plurality of binary coded digital time words, and magnetically recording said plurality of binary coded digital data words in parallel form over a predetermined time interval between at least two of said plurality of binary coded digital time words.

4. A method of obtaining reversible digital seismic data comprising the steps of: producing a seismic disturbance, generating a series of electrical analog signals from the disturbance, multiplexing said signals to a single output of analog data, converting said analog data to a plurality of binary coded digital data words, generating a plurality of binary coded digital time words, magnetically recording said plurality of binary coded digital data words in parallel form over a predetermined time interval between at least two of said plurality of binary coded digital time words, and recording the initial word of said plurality of binary coded digital time words at a predetermined time after said seismic disturbance.

5. A system for obtaining digital seismic data, comprising: a multiplexing unit, an analog-to-digital converter, a magnetic medium, means for applying multiple channels of analog seismic data to said multiplexer, means in said multiplexer responsive to the application of said analog seismic data to said multiplexer for extracting all of the data from said multiplexer in a single channel of analog data, means for converting the single channel of analog output into binary coded digital data, means for recording said binary coded digital data on said magnetic medium, a time control device responsive to a seismic disturbance, and means including said control device for recording binary coded digital time words on said magnetic medium.

6. Means for recording digital seismic data on a magnetic medium comprising: means for converting a plurality of electrical seismic signals into a single corresponding electircal analog signal containing seismic intelligence, means for converting said single analog signal into a plurality of binary coded digital data containing the said seismic intelligence, means for recording said binary coded digital data in parallel form on said medium, means for recording progressive binary coded digital time words in parallel form on said medium, logic means for placing said binary coded digital data on said medium between said binary coded digital time words, means for reconverting said binary coded digital data and said binary coded digital time words to analog data, and means for visibly displaying said reconverted data at a field station.

7. A reversible method for obtaining a digital seismic signal in a seismic exploration system which employs a seismic disturbance and a plurality of seismometers that generate and transmit a plurality of electrical seismic signals to a field data-gathering station in response to receiving seismic waves from the seismic disturbance, comprising the steps of: sequentially sampling the amplitudes of a plurality of electrical seismic signals to provide a single channel of analog data, converting the single channel of said analog data into digital data, generating digital time signals, applying said digital data and said digital time signals to a radio transmitter for the transmission thereof in digital form to a remotely located receiving station, recording said digital data and said digital time signals at said remote receiving station, and converting said digital data to analog data and recording said analog data.

8. A reversible method for obtaining a digital seismic signal in a seismic exploration system which employs a seismic disturbance and a plurality of seismometers which generate and transmit a plurality of electrical seismic signals to a field station in response to received seismic waves from the seismic disturbance, comprising the steps of: sequentially sampling the amplitudes of a plurality of electrical seismic signals to provide a single channel of analog data, converting the single channel of analog data into binary coded digital data, generating a plurality of digital time words each referenced to the occurrence time of said seismic disturbance, reversibly delivering said binary coded digital data and said digital time words to a magnetic recorder, magnetically recording said binary coded digital data and said digital time words in parallel form, applying a playback of said recorded digital data and said digital time words to a radio transmitter for transmission in digital form to a remotely located receiving station, receiving said transmission at said remotely located receiving station, recording said binary coded digital data and said digital time words, converting said binary coded digital data to analog form, recording said analog data, reconverting a playback of said first recorded binary coded digital data to analog data, and visibly displaying the reconverted analog data at the field station.

9. A reversible method for obtaining a binary digital seismic signal in a seismic exploration system employing a seismic disturbance and a plurality of seismometers which generate and transmit a plurality of electrical seismic signals to a field data-gathering station in response to receiving seismic waves from the seismic disturbance, comprising the steps of: sequentially sampling the amplitudes of a plurality of electrical seismic signals to provide a single channel of sampled analog data, converting each sample of analog data into a single binary coded digital data word, delaying each binary bit of said binary coded digital data word until all of the binary bits have been converted, simultaneously recording all the bits in a single binary coded digital data word on a magnetic medium in parallel form, generating progressive digital time information referenced to the occurrence time of said seismic disturbance, initiating said act of generating at the occurrence time of said seismic disturbance, and recording said digital time information on said recording medium.

References Cited in the file of this patent
UNITED STATES PATENTS

| | | |
|---|---|---|
| 2,272,070 | Reeves | Feb. 3, 1942 |
| 2,570,221 | Earp | Oct. 9, 1951 |
| 2,616,965 | Hoeppner | Nov. 4, 1952 |
| 2,678,254 | Schenck | May 11, 1954 |
| 2,753,546 | Knowles | July 3, 1956 |
| 2,765,405 | Gamarekian | Oct. 2, 1956 |
| 2,771,596 | Bellamy | Nov. 20, 1956 |
| 2,775,754 | Sink | Dec. 25, 1956 |

(Other references on following page)

UNITED STATES PATENTS

| | | |
|---|---|---|
| 2,783,448 | Piety | Feb. 26, 1957 |
| 2,791,764 | Gray | May 7, 1957 |
| 2,808,577 | Crawford | Oct. 1, 1957 |
| 2,858,475 | Blake | Oct. 28, 1958 |
| 2,870,436 | Kuder | Jan. 20, 1959 |
| 2,908,889 | Piety | Oct. 13, 1959 |
| 2,946,044 | Bolgiano | July 19, 1960 |
| 2,967,292 | Eisner | Jan. 3, 1961 |
| 2,968,022 | Unterberger | Jan. 10, 1961 |

OTHER REFERENCES

Goodall, "Telephone by Pulse Code Modulation," The Bell System Technical Journal, vol. XXVI, No. 3, July 1947.